US012658481B2

(12) United States Patent
Jeong et al.

(10) Patent No.: US 12,658,481 B2
(45) Date of Patent: Jun. 16, 2026

(54) SECONDARY BATTERY

(71) Applicant: Samsung SDI Co., Ltd., Yongin-si (KR)

(72) Inventors: Hyun Ki Jeong, Yongin-si (KR); Sung Soo Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 620 days.

(21) Appl. No.: 17/595,303

(22) PCT Filed: May 18, 2020

(86) PCT No.: PCT/KR2020/006502
§ 371 (c)(1),
(2) Date: Nov. 12, 2021

(87) PCT Pub. No.: WO2020/235904
PCT Pub. Date: Nov. 26, 2020

(65) Prior Publication Data
US 2022/0200059 A1     Jun. 23, 2022

(30) Foreign Application Priority Data

May 22, 2019     (KR) ........................ 10-2019-0060096

(51) Int. Cl.
H01M 10/0587     (2010.01)
H01M 4/70     (2006.01)
(Continued)

(52) U.S. Cl.
CPC ......... H01M 10/0587 (2013.01); H01M 4/70 (2013.01); H01M 10/0431 (2013.01); H01M 50/533 (2021.01); H01M 50/538 (2021.01)

(58) Field of Classification Search
CPC ........... H01M 10/0587; H01M 50/538; H01M 50/533; H01M 4/70; H01M 10/0431
(Continued)

(56) References Cited

U.S. PATENT DOCUMENTS 9,236,595 B2     1/2016 Lee et al.
10,079,380 B2     9/2018 Oh et al.
(Continued)

FOREIGN PATENT DOCUMENTS

CN     108701856 A     10/2018
EP     1249047 B1 * 10/2002 .............. H01M 4/13
(Continued)

OTHER PUBLICATIONS

JP 2006032112 mach. trans. (Year: 2006).*
(Continued)

*Primary Examiner* — Jonathan G Leong
*Assistant Examiner* — John S Medley
(74) *Attorney, Agent, or Firm* — Womble Bond Dickinson (US) LLP

(57) ABSTRACT

An embodiment of the present invention relates to a secondary battery and addresses the technical problem of providing a secondary battery capable of improving structural stability. To this end, the present invention provides a secondary battery comprising: an electrode assembly which comprises a first electrode plate having a first electrode-uncoated portion along an upper end thereof, a second electrode plate having a second electrode-uncoated portion along a lower end thereof, and a separator interposed between the first electrode plate and the second electrode plate, wherein at least one among the first electrode-uncoated portion and the second electrode-uncoated portion includes a reinforcing portion for reinforcing verticality; a can for accommodating the electrode assembly; a cap
(Continued)

assembly for sealing the can; a first current collector plate coupled to an upper end of the first electrode-uncoated portion and electrically connected to the cap assembly; and a second current collector plate coupled to a lower end of the second electrode-uncoated portion and electrically connected to the can.

7 Claims, 5 Drawing Sheets

(51) Int. Cl.
  *H01M 10/04*          (2006.01)
  *H01M 50/533*        (2021.01)
  *H01M 50/538*        (2021.01)

(58) Field of Classification Search
  USPC ......................................................... 429/211
  See application file for complete search history.

(56)                    References Cited

U.S. PATENT DOCUMENTS

| | | | |
|---|---|---|---|
| 2006/0008702 A1 | 1/2006 | Cheon et al. | |
| 2009/0280406 A1* | 11/2009 | Kozuki | H01M 10/0431 |
| | | | 429/209 |
| 2011/0151318 A1* | 6/2011 | Lee | H01M 10/0431 |
| | | | 429/211 |
| 2012/0045689 A1* | 2/2012 | Okabe | H01M 4/0435 |
| | | | 427/58 |
| 2012/0237810 A1* | 9/2012 | Sasaki | H01M 50/538 |
| | | | 429/94 |
| 2014/0079872 A1* | 3/2014 | Uchida | H01M 10/0525 |
| | | | 427/58 |
| 2014/0147716 A1 | 5/2014 | Oh et al. | |
| 2016/0079574 A1* | 3/2016 | Song | H01M 4/70 |
| | | | 429/163 |
| 2016/0301060 A1 | 10/2016 | Oh et al. | |
| 2018/0315964 A1* | 11/2018 | Nam | H01M 50/1243 |
| 2018/0337392 A1* | 11/2018 | Lee | H01M 4/139 |
| 2023/0317913 A1* | 10/2023 | Park | H01M 4/0404 |
| | | | 429/211 |

FOREIGN PATENT DOCUMENTS

| | | | | | |
|---|---|---|---|---|---|
| JP | 2006032112 | A | * | 2/2006 | ............ Y02E 60/10 |
| JP | 4474148 | B2 | | 6/2010 | |
| KR | 10-2004-0065788 | A | | 7/2004 | |
| KR | 10-2006-0097987 | A | | 9/2006 | |
| KR | 10-1137364 | B1 | | 4/2012 | |
| KR | 20120035119 | A | * | 4/2012 | ............ B21B 27/02 |
| KR | 10-2013-0017817 | A | | 2/2013 | |
| KR | 10-1577188 | B1 | | 12/2015 | |
| KR | 10-2017-0000673 | A | | 1/2017 | |
| KR | 10-1845968 | B1 | | 4/2018 | |
| KR | 2018 0041019 | A | | 4/2018 | |
| KR | 10-2018-0119365 | A | | 11/2018 | |
| WO | WO-2018008926 | A1 | * | 1/2018 | ......... H01M 4/0404 |

OTHER PUBLICATIONS

International Search Report for Corresponding International Application No. PCT/KR2020/006502, dated Aug. 21, 2020, 4pp.
Extended European Search Report for Application No. EP 20 80 9088.6, dated May 3, 2024, 7 pages.
Korean Office Action dated Aug. 2, 2024 for corresponding Korean Patent Application No. 10-2019-0060096, 6 pages.
Chinese Office Action for CN Application No. 202080036937.8 dated Jan. 8, 2024, 15 pages.

* cited by examiner

1100

1120

SECONDARY BATTERY

CROSS-REFERENCE TO RELATED APPLICATIONS

This application is a U.S. National Phase Patent Application of International Application Number PCT/KR2020/006502, filed on May 18, 2020, which claims priority to Korean Patent Application Number 10-2019-0060096, filed on May 22, 2019, the entire content of both of which is incorporated herein by reference.

TECHNICAL FIELD

An embodiment of the present invention relates to a secondary battery.

BACKGROUND ART

Secondary batteries are referred to as rechargeable and dischargeable batteries, unlike non-rechargeable primary batteries. Low-capacity secondary batteries have been generally used in portable small-sized electronic devices such as a smartphone, a laptop computer, a digital camera, and a camcorder, and large-capacity secondary batteries have been widely used to drive motors and store power in a hybrid vehicle, an electric vehicle, and the like.

The secondary batteries may be classified into cylindrical, prismatic, pouch-type secondary batteries, and the like, according to the outer shapes thereof. Among these secondary batteries, the cylindrical secondary battery includes an electrode assembly wound in a jelly-roll shape, a can for accommodating the electrode assembly and an electrolyte, a cap assembly for sealing the can, and the like.

The above information disclosed in this section of BACKGROUND ART is only for enhancement of understanding of the background of the present invention, and therefore it may contain information that does not form the related art.

DETAILED DESCRIPTION OF THE INVENTION

Technical Problem

An embodiment of the present invention provides a secondary battery capable of improving structural stability.

Solution to the Problem

A secondary battery according to an embodiment of the present invention includes: an electrode assembly which includes a first electrode plate having a first electrode-uncoated portion along an upper end thereof, a second electrode plate having a second electrode-uncoated portion along a lower end thereof, and a separator interposed between the first electrode plate and the second electrode plate, wherein at least one among the first electrode-uncoated portion and the second electrode-uncoated portion includes a reinforcing portion for reinforcing verticality; a can for accommodating the electrode assembly; a cap assembly for sealing the can; a first current collector plate welded to an upper end of the first electrode-uncoated portion and electrically connected to the cap assembly; and a second current collector plate welded to a lower end of the second electrode-uncoated portion and electrically connected to the can.

Also, the reinforcing portion may be an embossing portion in which a plurality of embossing patterns elongated in an up-down direction are formed.

Also, when the first electrode-uncoated portion has the embossing portion, the embossing portion may be provided with a predetermined width along a lower portion of the first electrode-uncoated portion. When the second electrode-uncoated portion has the embossing portion, the embossing portion may be provided with a predetermined width along an upper portion of the second electrode-uncoated portion.

Also, when the first electrode-uncoated portion has the embossing portion, the embossing portion may have a depth of 30% to 70% of a thickness of the first electrode-uncoated portion. When the second electrode-uncoated portion may have the embossing portion, the embossing portion has a depth of 30% to 70% of a thickness of the second electrode-uncoated portion.

Also, the embossing patterns may be arranged with a constant height along a direction perpendicular to the up-down direction, and each may have a length corresponding to a width of the embossing portion.

Also, the embossing patterns may be arranged with different heights along a direction perpendicular to the up-down direction, and each may have a length less than a width of the embossing portion.

Also, when the first electrode-uncoated portion has the embossing portion, a bending groove may be formed above the embossing portion and extend along a direction perpendicular to the up-down direction. When the second electrode-uncoated portion has the embossing portion, a bending groove may be formed below the embossing portion and extend along a direction perpendicular to the up-down direction.

Effect of the Invention

In the secondary battery according to the embodiment of the present invention, the embossing patterns elongated in the up-down direction may be used to reinforce the verticality of the electrode-uncoated portion, thereby tightly welding the current collector plate to the electrode-uncoated portion.

Also, through this, it is possible to prevent the electrode-uncoated portion from being deformed and from being short-circuited.

MODE FOR IMPLEMENTING THE INVENTION

Figure 1:
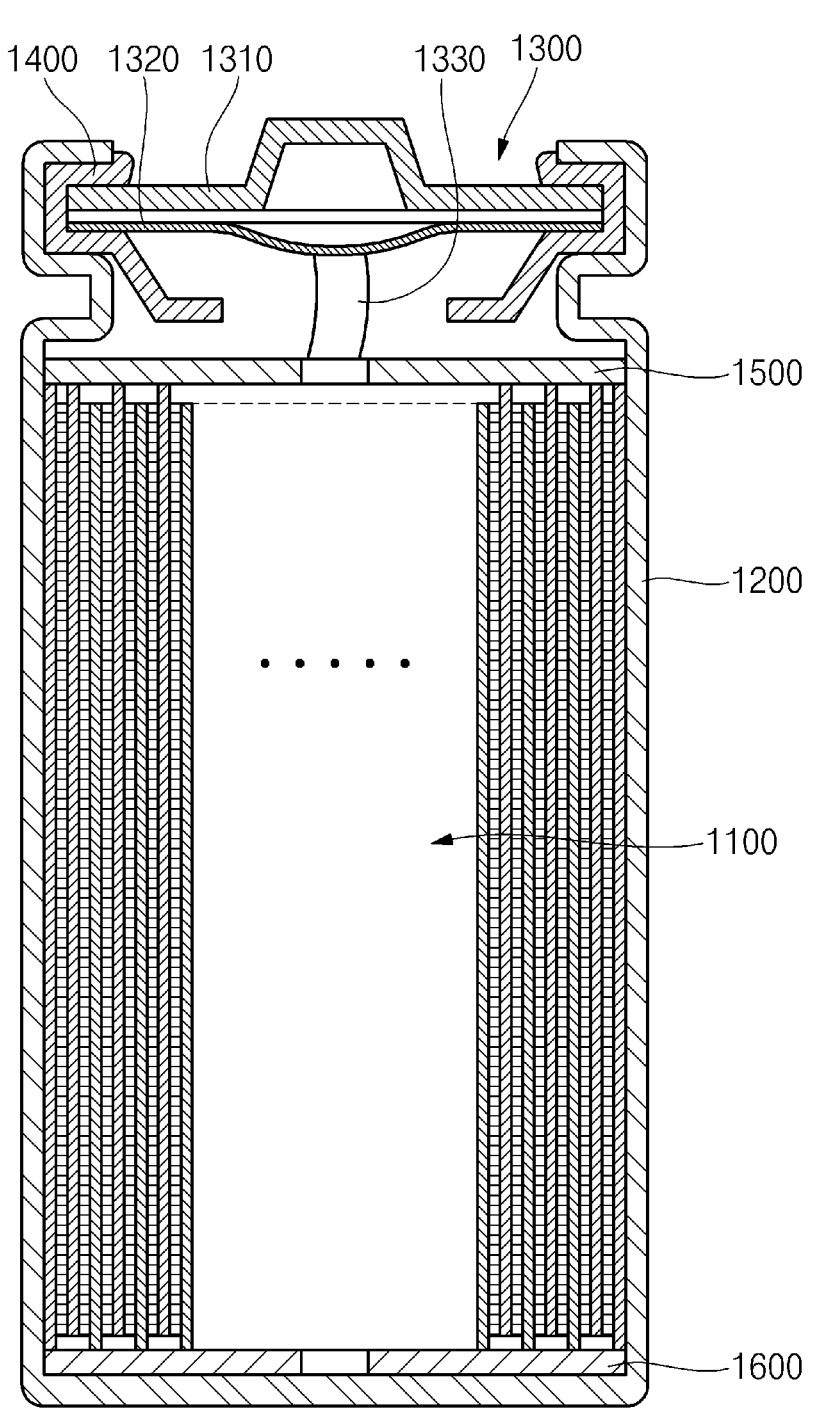
FIG. 1 shows a cross-section of a secondary battery according to an embodiment of the present invention.

Hereinafter, preferred embodiments of the present invention will be described in detail with reference to the accompanying drawings.

The embodiments of the present invention are provided to more fully describe the present invention to those skilled in the art. The following embodiments may be modified in many different forms, and the scope of the present invention is not limited to the following embodiments. Rather, these embodiments are provided so that this disclosure will be thorough and complete, and will fully convey the concept of the present invention to those skilled in the art.

Also, the thickness and size of each layer are exaggerated in the drawings for convenience of explanation and clarity, and like reference numerals in the drawings refer to like elements throughout. As used in this specification, the term "and/or" may include any and all combinations of one or more of the associated listed items. Also, in this specification, it will be understood that when an element A is referred to as being "connected to" an element B, the element A can be directly connected to the element B, or an intervening element C may be interposed between the elements A and B so that the element A can be indirectly connected to the element B.

The terminologies used herein are for the purpose of describing particular embodiments only and are not intended to be limiting the present invention. As used herein, the singular forms may include the plural forms as well, unless the context clearly indicates otherwise. Also, it will be further understood that the terms "comprise or include" and/or "comprising or including," when used in this specification, specify the presence of stated features, numbers, steps, operations, members, elements, and/or groups thereof, but do not preclude the presence or addition of one or more other features, numbers, steps, operations, members, elements, and/or groups thereof.

It will be understood that, although the terms first, second, etc. may be used herein to describe various members, components, regions, layers, and/or portions, these members, components, regions, layers, and/or portions should not be limited by these terms. These terms are only used to distinguish one member, component, region, layer, or portion from another region, layer, or portion. Thus, a first member, component, region, layer, or portion, which will be described below, may also refer to a second member, component, region, layer, or portion, without departing from the teaching of the present invention.

Spatially relative terms, such as "beneath," "below," "lower," "above," "upper," may be used herein for easy understanding of one element or feature and another element(s) or feature(s) as illustrated in the drawings. These spatially relative terms are intended for easy comprehension of the prevent invention according to various process states or usage states of the prevent invention, and thus, the present invention is not limited thereto. For example, when an element or feature in the drawings is turned over, the element and feature described as "beneath" or "below" are changed into "above" or "upper". Thus, the exemplary term "beneath" can encompass both orientations of "above" and "below".

FIG. 1 shows a cross-section of a secondary battery 1000 according to an embodiment of the present invention.

Figure 2:
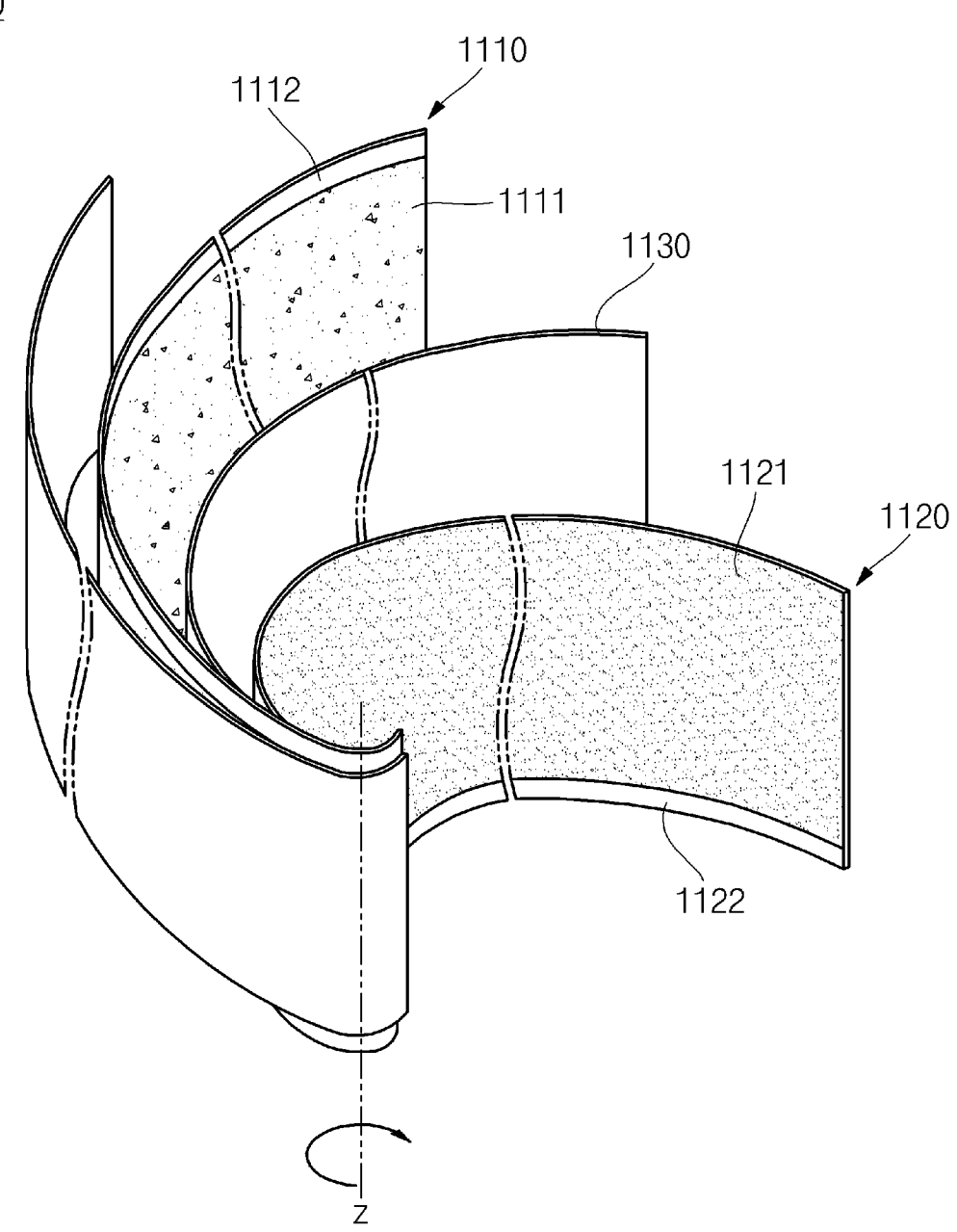
FIG. 2 shows an electrode assembly of a secondary battery according to an embodiment of the present invention.

FIG. 2 shows an electrode assembly 1100 of the secondary battery 1000 according to an embodiment of the present invention.

Figure 3:
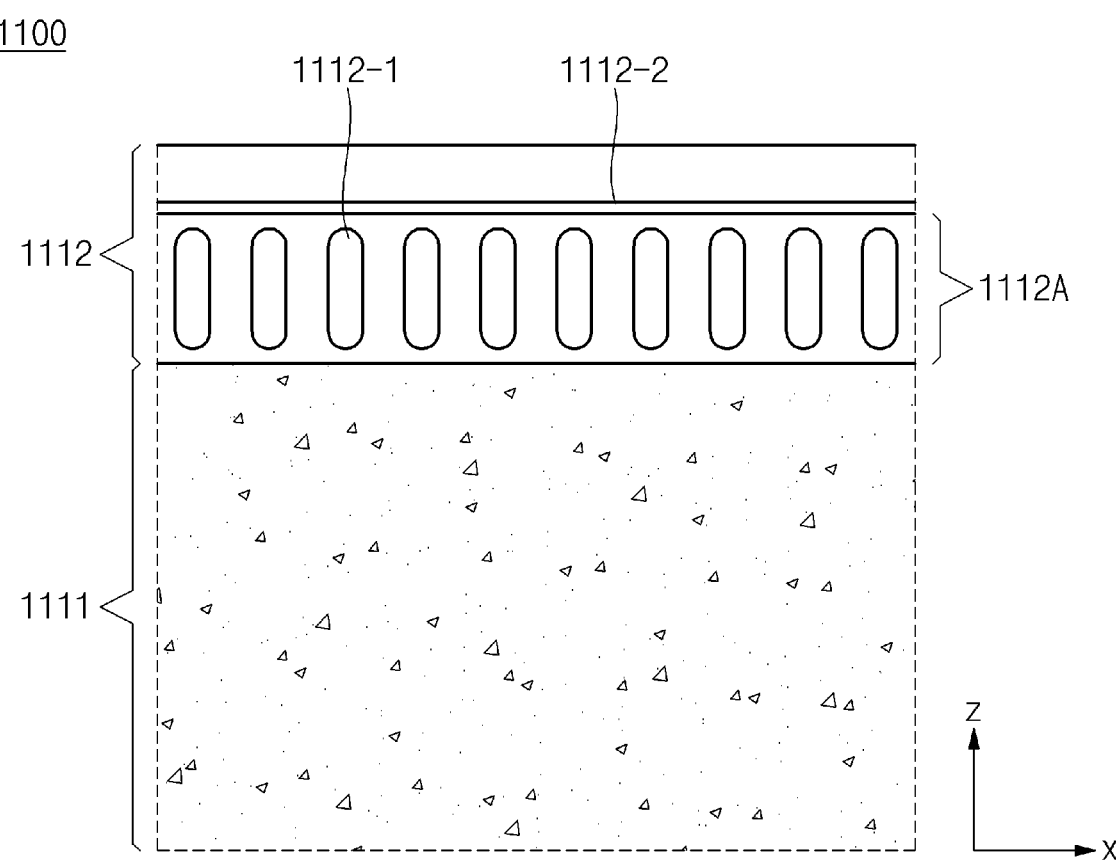
FIG. 3 shows a portion of a first electrode plate of a secondary battery according to an embodiment of the present invention.
Figure 4:
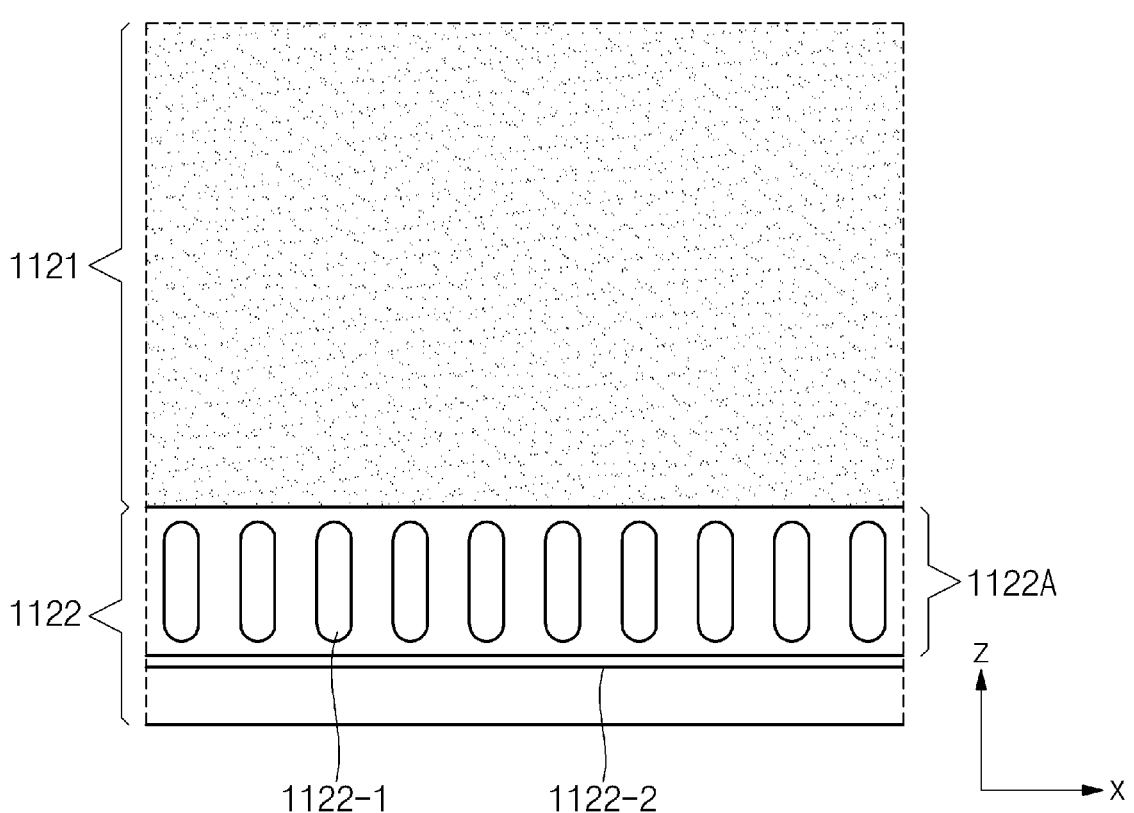
FIG. 4 shows a portion of a second electrode plate of a secondary battery according to an embodiment of the present invention.

FIG. 3 shows a portion of a first electrode plate 1110 of the secondary battery 1000 according to an embodiment of the present invention, and FIG. 4 shows a portion of a second electrode plate 1120 of the secondary battery 1000 according to an embodiment of the present invention.

Referring to FIG. 1, the secondary battery 1000 according to an embodiment of the present invention includes an electrode assembly 1100, a can 1200, a cap assembly 1300, an insulating gasket 1400, a first current collector plate 1500, and a second current collector plate 1600.

Referring to FIG. 2 together, the electrode assembly 1100 includes a first electrode plate 1110, a second electrode plate 1120, and a separator 1130, and is wound in a so-called jelly-roll shape.

The first electrode plate 1110 has: a first electrode active material portion 1111 which is provided by applying a first electrode active material onto a first electrode substrate then rolling the same; and a first electrode-uncoated portion 1112 on which the first electrode active material is not applied. The first electrode-uncoated portion 1112 is provided with a predetermined width along the upper end of the first electrode plate 1110.

The first electrode plate 1110 may serve as a positive electrode plate. In this case, the first electrode substrate may be made of, for example, an aluminum foil, and the first electrode active material may be made of, for example, a transition metal oxide.

The second electrode plate 1120 has: a second electrode active material portion 1121 which is provided by applying a second electrode active material onto a second electrode substrate then rolling the same; and a second electrode-uncoated portion 1122 on which the second electrode active material is not applied. The second electrode-uncoated portion 1122 is provided with a predetermined width along the lower end of the second electrode plate 1120.

The second electrode plate 1120 may serve as a negative electrode plate. In this case, the second electrode substrate may be made of, for example, a copper or aluminum foil, and the second electrode active material may be made of, for example, graphite or carbon.

Meanwhile, at least one among the first electrode-uncoated portion 1112 and the second electrode-uncoated portion 1122 may include a reinforcing portion 1112A or 1122A for reinforcing verticality. In other words, only the first electrode-uncoated portion 1112 may have the reinforcing portion 1112A, only the second electrode-uncoated portion 1122 may have the reinforcing portion 1122A, or both the first electrode-uncoated portion 1112 and the second electrode-uncoated portion 1122 may have the reinforcing portions 1112A and 1122A, respectively.

The reinforcing portions 1112A and 1122A may be embossing portions 1112A and 1122A in which a plurality of embossing patterns 1112-1 and 1122-1 are formed in the respective electrode-uncoated portions 1112 and 1122.

Hereinafter, a case in which both the first electrode-uncoated portion 1112 and the second electrode-uncoated portion 1122 have the embossing portions 1112A and 1122A will be described. The embossing portion 1112A of the first electrode-uncoated portion 1112 is referred to as a "first embossing portion 1112A", and the embossing portion 1122A of the second electrode-uncoated portion 1122 is referred to as a "second embossing portion 1122A".

First, a case in which the first electrode-uncoated portion 1112 has the first embossing portion 1112A will be described with reference to FIG. 3.

The first embossing portion 1112A is provided in a region of the first electrode-uncoated portion 1112, which is adjacent to the first electrode active material portion 1111. In other words, the first embossing portion 1112A is provided with a predetermined width along a lower portion of the first electrode-uncoated portion 1112.

Here, each of the first embossing patterns 1112-1 may be formed in a shape elongated in the up-down direction (z-axis direction). For example, each of the first embossing patterns 1112-1 may be formed in an elliptical, rectangular shape, or the like.

Also, each of the first embossing patterns 1112-1 may have a depth of about 30% to about 70% of a thickness of the first electrode-uncoated portion 1112.

Also, the first embossing patterns 1112-1 each may have a length corresponding to the width of the first embossing portion 1112A, that is, a length substantially the same as or slightly less than the width of the first embossing portion 1112A, and may be arranged with a constant height along a direction (x-axis direction) perpendicular to the z-axis direction.

The first embossing portion 1112A may be formed by pressing the first electrode-uncoated portion 1112 with a roller that has protrusions and recessions corresponding to the first embossing patterns 1112-1.

According to the above, a region of the first electrode substrate, corresponding to the first electrode active material portion 1111 may be somewhat stretched while the first electrode active material is applied onto the first electrode substrate and then rolled so as to form the first electrode active material portion 1111 as mentioned earlier. As the first electrode-uncoated portion 1112 is pressed to form the first embossing portion 1112A as described above, a region of the first electrode substrate, corresponding to the first electrode-uncoated portion 1112, may also be stretched together. Thus, it is possible to prevent the first electrode plate 1110 from bending or twisting as only the region of the first electrode substrate, corresponding to the first electrode active material portion 1111, is stretched asymmetrically.

Furthermore, a first bending groove 1112-2 may be formed above the first embossing portion 1112A and extend along the x-axis direction.

Next, a case in which the second electrode-uncoated portion 1122 has the second embossing portion 1122A will be described with reference to FIG. 4.

The second embossing portion 1122A is provided with a predetermined width along an upper portion of the second electrode-uncoated portion 1122.

Here, each of second embossing patterns 1122-1 may be formed in an elliptical, rectangular shape, or the like elongated in the z-axis direction.

Also, each of the second embossing patterns 1122-1 may have a depth of about 30% to about 70% of a thickness of the second electrode-uncoated portion 1122.

Also, the second embossing patterns 1122-1 each may have a length substantially the same as or slightly less than the width of the second embossing portion 1122A, and may be arranged with a constant height along the x-axis direction.

The second embossing portion 1122A may be formed by pressing the second electrode-uncoated portion 1122 with a roller that has protrusions and recessions corresponding to the second embossing patterns 1122-1.

According to the above, as described earlier, a region of the second electrode substrate, corresponding to the second electrode active material portion 1121, and a region corresponding to second electrode-uncoated portion 1122 may be stretched overall, and thus, it is possible to prevent the second electrode plate 1120 from bending or twisting.

Furthermore, a second bending groove 1122-2 may be formed below the second embossing portion 1122A and extend along the x-axis direction.

The separator 1130 is interposed between the first electrode plate 1110 and the second electrode plate 1120, and plays a role in preventing a short-circuit between the first electrode plate 1110 and the second electrode plate 1120 and allowing, for example, lithium ions to move.

The separator 1130 may be made of, for example, a polyethylene or polypropylene film or a composite film of polyethylene and polypropylene.

Referring to FIG. 1 again, the can 1200 has a cylindrical shape with an open top surface and plays a role in accommodating the electrode assembly 1100 and the electrolyte.

Here, the electrolyte may be made of, for example, an organic solvent such as ethylene carbonate (EC), propylene carbonate (PC), diethyl carbonate (DEC), dimethyl carbonate (DMC), or ethyl methyl carbonate (EMC), and a lithium salt such as $LiPF_6$ or $LiBF_4$.

The cap assembly 1300 is for sealing the can 1200, and includes a cap plate 1310, a safety vent 1320, and a lid 1330.

The cap plate 1310 is provided with a terminal portion protruding upward.

When a gas is generated inside the secondary battery 1000 due to overcharging or other abnormal operations thereof and exceeds a specific pressure, the safety vent 1320 may be automatically ruptured to discharge the gas to the outside, and accordingly, plays a role in preventing explosion of the secondary battery 1000.

The lid 1330 plays a role in electrically connecting the electrode assembly 1100 and the cap plate 1310 via the first current collector plate 1500 which will be described later.

The insulating gasket 1400 is installed between the can 1200 and the cap assembly 1300 and plays a role in providing insulation therebetween.

The first current collector plate 1500 may be formed in an approximately plate shape.

Accordingly, the first current collector plate 1500 is coupled to the upper end of the first electrode-uncoated portion 1112 and electrically connected to the cap assembly 1300.

Here, in order for the first current collector plate 1500 to be firmly coupled to the upper end of the first electrode-uncoated portion 1112, the first current collector plate 1500 is disposed at the upper end of the first electrode-uncoated portion 1112 and then welded while being compressed. In this case, as the upper end of the first electrode-uncoated portion 1112 is bent uniformly about the first bending groove 1112-2, the first current collector plate 1500 may be bonded entirely and tightly to the upper end of the first electrode-uncoated portion 1112.

Furthermore, the verticality of the lower portion (the first embossing portion 1112A) of the first electrode-uncoated portion 1112 is reinforced by the first embossing patterns 1112-1 vertically elongated, and thus, it is possible to prevent the lower portion of the first electrode-uncoated portion 1112 from curving or buckling even when the first current collector plate 1500 is compressed severely. Thus, not only may the first current collector plate 1500 be very tightly bonded to the upper end of the first electrode-uncoated portion 1112, but through this, it is possible to prevent the lower portion of the first electrode-uncoated portion 1112 from being inappropriately deformed and short-circuited.

The second current collector plate 1600 may also be formed in an approximately circular plate shape. Accordingly, the second current collector plate 1600 is coupled to the lower end of the second electrode-uncoated portion 1122 and electrically connected to the can 1200.

Here, in order for the second current collector plate 1600 to be firmly coupled to the lower end of the second electrode-uncoated portion 1122, the second current collector plate 1600 is disposed at the lower end of the second electrode-uncoated portion 1122 and then welded while being compressed. In this case, as the upper portion of the second electrode-uncoated portion 1122 is bent uniformly about the second bending groove 1122-2, the second current collector plate 1600 may be bonded entirely and tightly to the upper end of the second electrode-uncoated portion 1122.

Furthermore, the verticality of the upper portion (the second embossing portion 1122A) of the second electrode-uncoated portion 1122 is reinforced by the second embossing patterns 1122-1 vertically elongated, and thus, it is possible to prevent the upper portion of the second electrode-uncoated portion 1122 from curving or buckling even when the second current collector plate 1600 is compressed severely. Furthermore, through this, it is possible to prevent the upper portion of the second electrode-uncoated portion 1122 from being inappropriately deformed and short-circuited.

Figure 5:
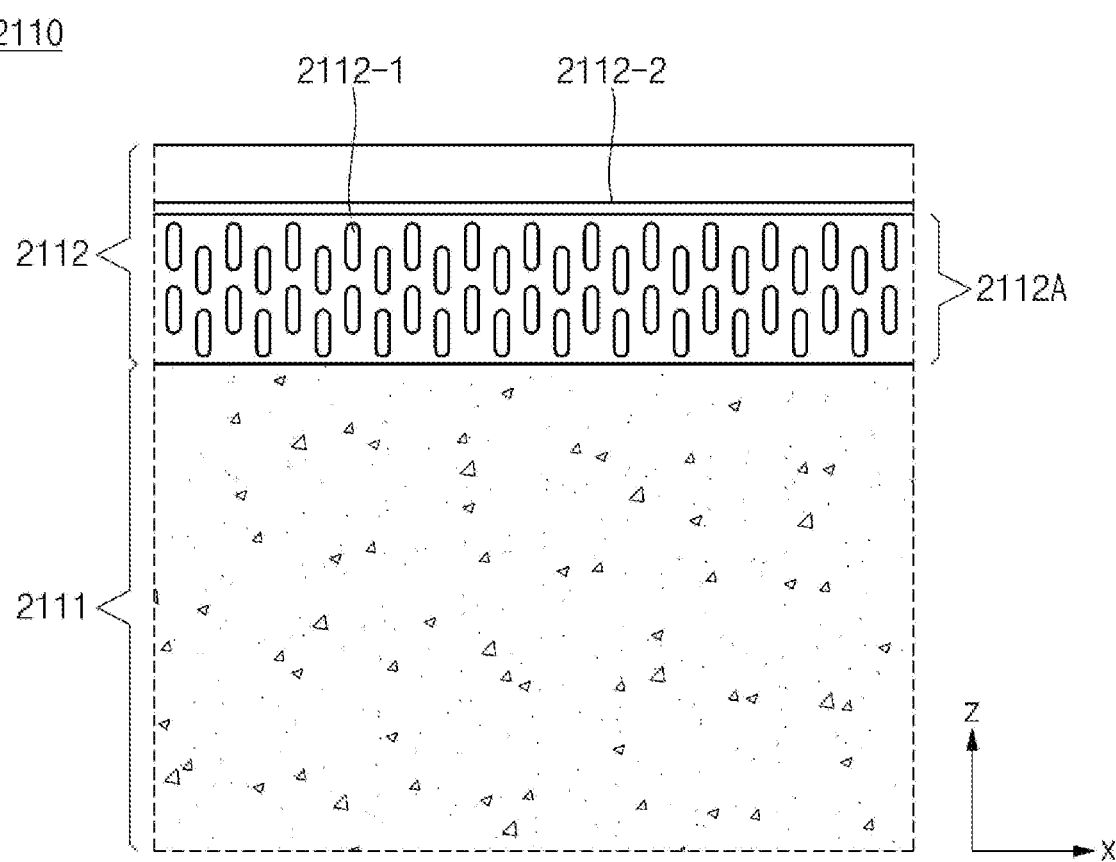
FIG. 5 shows a portion of a first electrode plate of a secondary battery according to another embodiment of the present invention.

FIG. 5 shows a portion of a first electrode plate 2110 of a secondary battery according to another embodiment of the present invention.

When comparing the secondary battery according to another embodiment of the present invention with the secondary battery 1000 according to the embodiment of the present invention described earlier with reference to FIGS. 1 to 4, there are differences in the length and arrangement of first embossing patterns 2112-1.

Other features are substantially the same as those of the secondary battery 1000 according to the embodiment of the present invention. Even if there is a difference, it is obvious that a person skilled in the art can make a modification for the difference. Thus, the repetitive description thereof will be omitted.

Referring to FIG. 5, the first embossing patterns 2112-1 each may have a shape elongated in the z-axis direction but have a length less than the width of a first embossing portion 2112A, and may be alternately arranged with different heights along the x-axis direction. For example, a zigzag arrangement may be formed.

Also, a plurality of first embossing patterns 2112-1 may be arranged in a line along the z-axis direction.

Although only the first electrode plate 2110 has been described for convenience, this configuration may be applied to a second electrode plate.

Furthermore, the embossing patterns 1112-1, 1122-1, and 2112-1 may have any other lengths and arrangements as long as they are formed in a shape elongated in the z-axis direction and may reinforce the verticality of the electrode-uncoated portions 1112, 1122, and 2112. For example, a structure, in which the embossing patterns 1112-1 and 1122-1 of the secondary battery 1000 according to the embodiment of the present invention are combined with the embossing patterns 2112-1 of the secondary battery according to another embodiment of the present invention, is also possible.

The above-described embodiment is merely one embodiment for embodying the secondary battery according to the present invention, and thus the present invention is not limited to the foregoing embodiment, and the technical spirits of the present invention include all ranges of technologies that may be variously modified by those of ordinary skill in the art, to which the present invention pertains, without departing from the subject matter of the present invention as set forth in the following claims.

The invention claimed is:

1. A secondary battery comprising:
an electrode assembly which comprises a first electrode plate having a first electrode-uncoated portion along an upper end thereof, a second electrode plate having a second electrode-uncoated portion along a lower end thereof, and a separator interposed between the first electrode plate and the second electrode plate, wherein at least one among the first electrode-uncoated portion or the second electrode-uncoated portion includes a first region, a second region, and a bending groove;
a can for accommodating the electrode assembly;
a cap assembly for sealing the can;
a first current collector plate coupled to at least a portion of the first electrode-uncoated portion and electrically connected to the cap assembly; and
a second current collector plate coupled to at least a portion of the second electrode-uncoated portion and electrically connected to the can,
wherein the first region is connected to at least one of the first current collector plate or the second current collector plate,
wherein the second region is adjacent to an active material portion of at least one of the first electrode plate or the second electrode plate and includes a reinforcing portion for reinforcing verticality of the second region, wherein the reinforcing portion is located within the second region and the first region connected to the at least one of the first current collector plate or the second current collector plate, is free of the reinforcing portion,
wherein the first electrode-uncoated portion or the second electrode-uncoated portion that includes the bending groove is configured to be bent about the bending groove,
wherein the reinforcing portion is an embossing portion, the embossing portion being integrally formed with the first electrode-uncoated portion or the second electrode-uncoated portion.

2. The secondary battery of claim 1, wherein in the embossing portion, a plurality of embossing patterns elongated in an up-down direction are formed.

3. The secondary battery of claim 2, wherein when the first electrode-uncoated portion has the embossing portion, the second region including the embossing portion is provided with a predetermined width along a lower portion of the first electrode-uncoated portion, and
when the second electrode-uncoated portion has the embossing portion, the second region including the embossing portion is provided with a predetermined width along an upper portion of the second electrode-uncoated portion.

4. The secondary battery of claim 2, wherein when the first electrode-uncoated portion has the embossing portion, the embossing portion has a depth of 30% to 70% of a thickness of the first electrode-uncoated portion, and
when the second electrode-uncoated portion has the embossing portion, the embossing portion has a depth of 30% to 70% of a thickness of the second electrode-uncoated portion.

5. The secondary battery of claim 2, wherein the plurality of embossing patterns is arranged with a constant height along a direction perpendicular to the up-down direction, and each has a length corresponding to a width of the embossing portion.

6. The secondary battery of claim 2, wherein the plurality of embossing patterns is arranged with different heights along a direction perpendicular to the up-down direction, and each has a length less than a width of the embossing portion.

7. The secondary battery of claim 2, wherein when the first electrode-uncoated portion has the embossing portion, the bending groove is formed above the embossing portion and extends along a direction perpendicular to the up-down direction, and when the second electrode-uncoated portion has the embossing portion, the bending groove is formed below the embossing portion and extends along a direction perpendicular to the up-down direction.

* * * * *